United States Patent [19]

Leigh-Monstevens

[11] Patent Number: 4,771,874
[45] Date of Patent: Sep. 20, 1988

[54] SELF-ALIGNING BEARING

[75] Inventor: Keith-V. Leigh-Monstevens, Troy, Mich.

[73] Assignee: Automotive Products plc, Warwickshire, England

[21] Appl. No.: 709,089

[22] Filed: Mar. 7, 1985

Related U.S. Application Data

[63] Continuation-in-part of Ser. No. 585,123, Mar. 1, 1984, Pat. No. 4,742,902.

[51] Int. Cl.⁴ .............................................. F16D 23/14
[52] U.S. Cl. .................................. 192/98; 192/110 B
[58] Field of Search ............. 192/98, 110 B; 384/482, 384/607

[56] References Cited

U.S. PATENT DOCUMENTS

| | | | |
|---|---|---|---|
| 3,870,384 | 3/1975 | Ladin | 192/110 B |
| 3,920,107 | 11/1975 | Limacher | 192/98 |
| 4,371,068 | 2/1983 | Billet | 192/98 |
| 4,526,258 | 7/1985 | Huber | 192/88 A |
| 4,555,007 | 11/1985 | Harrington et al. | 192/98 |
| 4,566,578 | 1/1986 | Monstevens et al. | 192/98 |
| 4,608,741 | 9/1986 | Mallet | 192/98 X |
| 4,643,286 | 2/1987 | Lassiaz | 192/98 |

FOREIGN PATENT DOCUMENTS 2745929  4/1979  Fed. Rep. of Germany.

Primary Examiner—Rodney H. Bonck
Attorney, Agent, or Firm—Krass & Young

[57] ABSTRACT

A bearing assembly having particular usefulness as a throw-out or release bearing for a motor vehicle mechanical clutch. The bearing assembly has a cylindrical housing provided with an annular end wall engaged with, or mounted on, the flange of a bearing carrier. The non-revolving race of the bearing is engaged against the housing end wall such as to permit lateral displacement of the race relative to the housing end wall. The revolving race of the bearing supports an annular adapter having an outwardly extending flange engaged with the release fingers of the clutch mechanism. The housing is closed by an annular end cap having a flange radially extending between the end face of the revolving race and the adapter flange and provided with a seal having its lip engaged with the revolving race end face or with the back surface of the adapter flange. A second annular seal is preferably provided between the end of the adapter opposite to the flange and the surface of the housing end wall. The seals permit rotary motion between the bearing elements and transverse motion such as to allow the bearing to self-align within the housing. Preferably, spring means are disposed within the housing such as to bias the non-revolving race end face in engagement with the housing end wall, with a force sufficient to hold the surfaces in engagement but insufficient to prevent lateral motion of the non-revolving race relative to the housing.

30 Claims, 3 Drawing Sheets

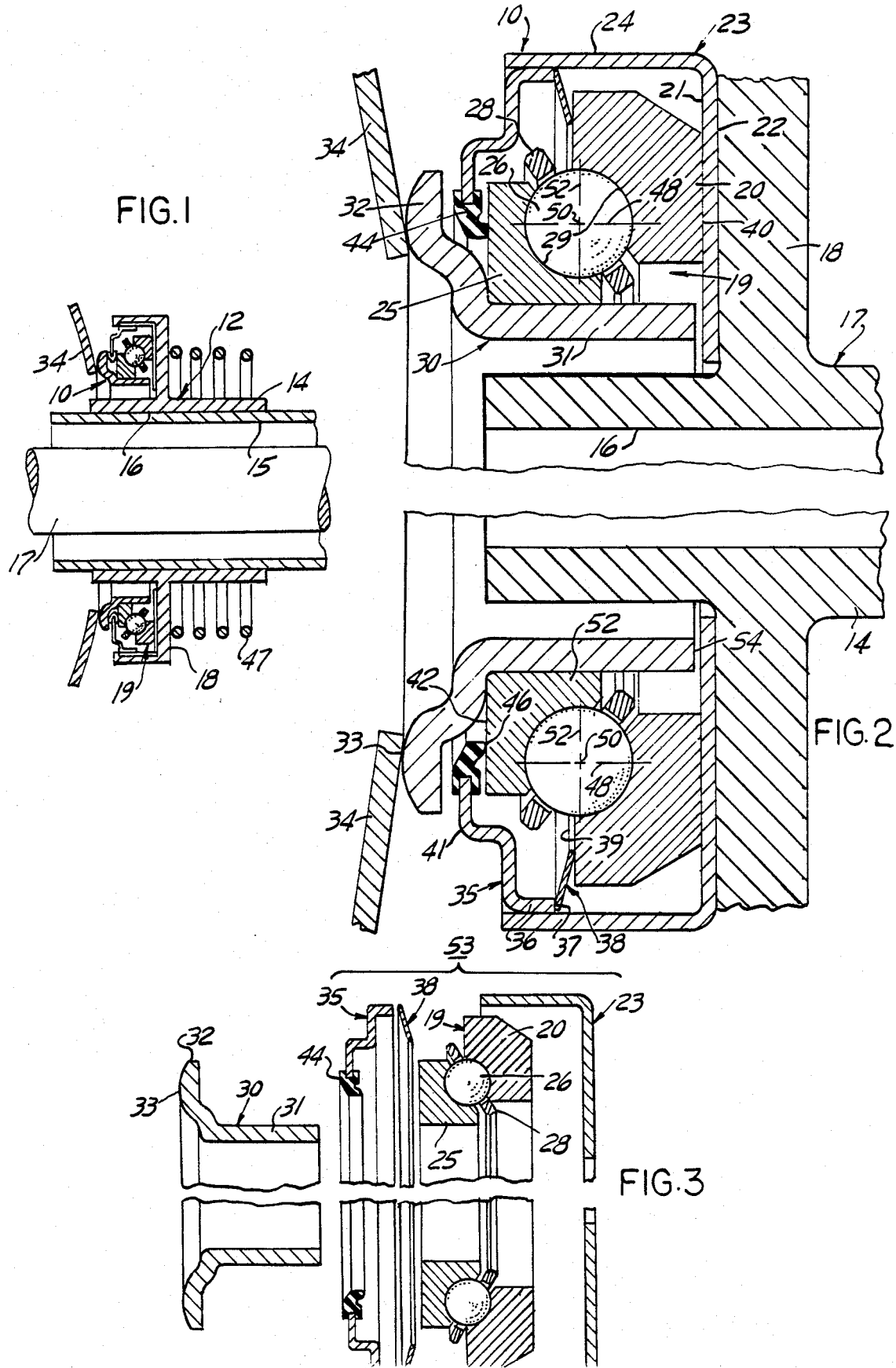

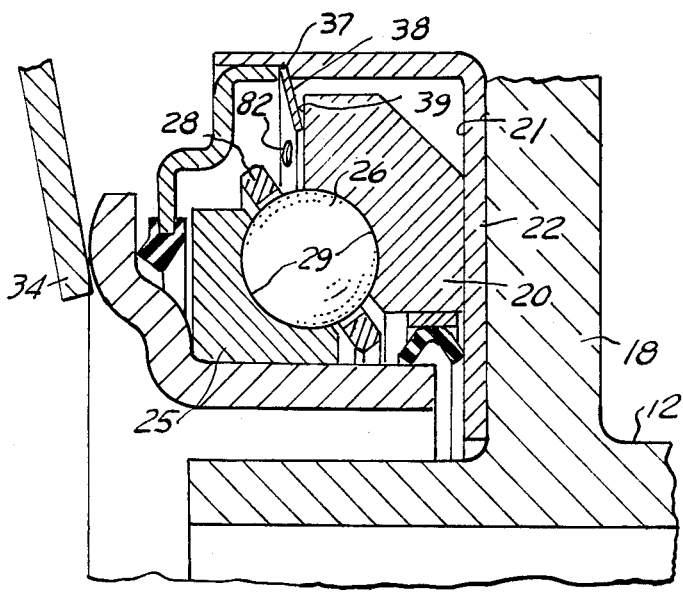
FIG. 9
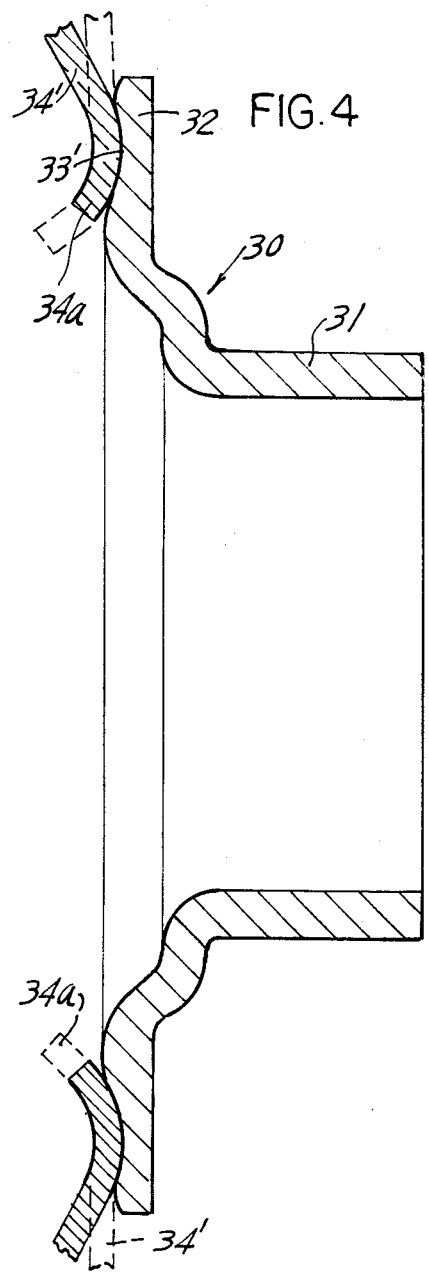
FIG. 4
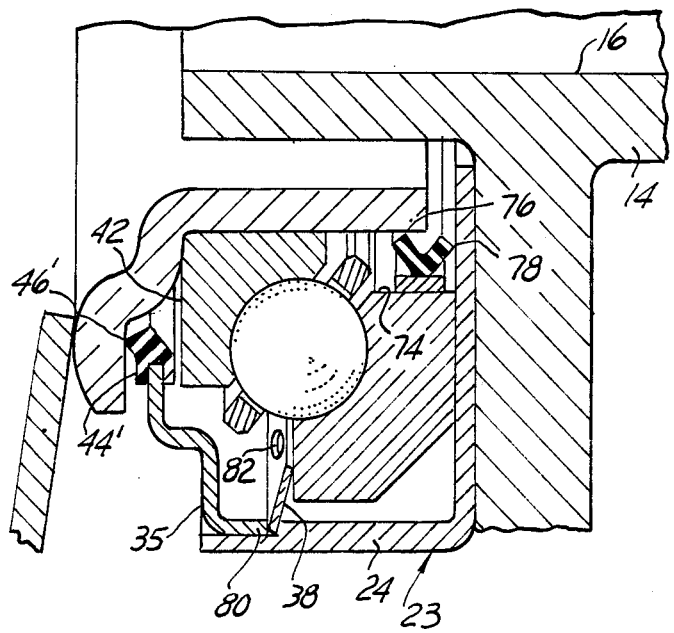

FIG. 5
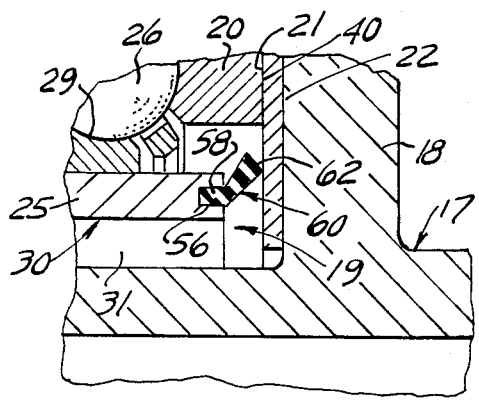
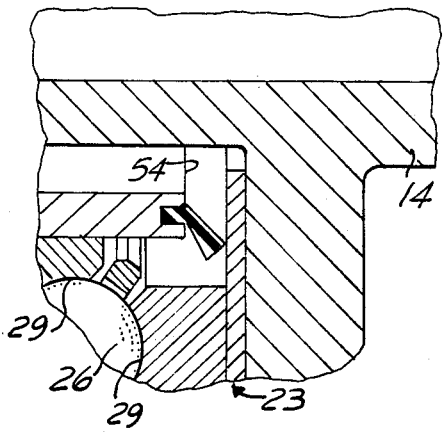
FIG. 6
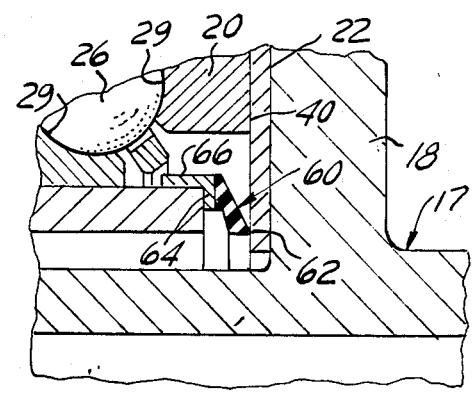
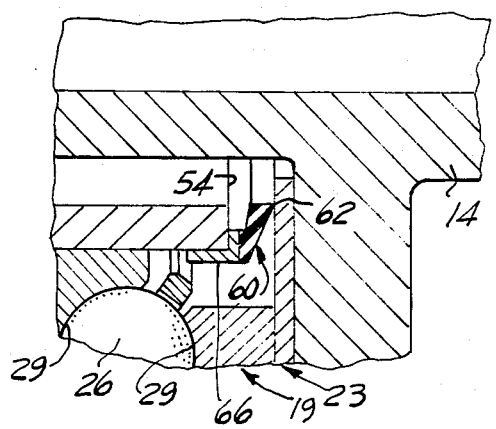
FIG. 7
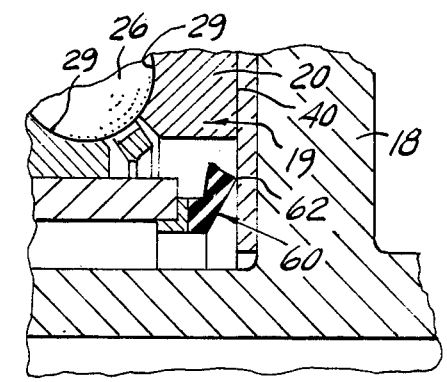
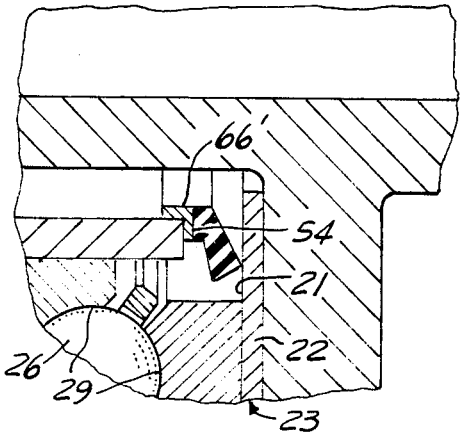
FIG. 8
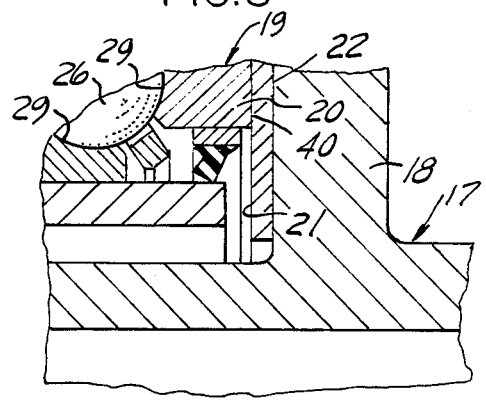
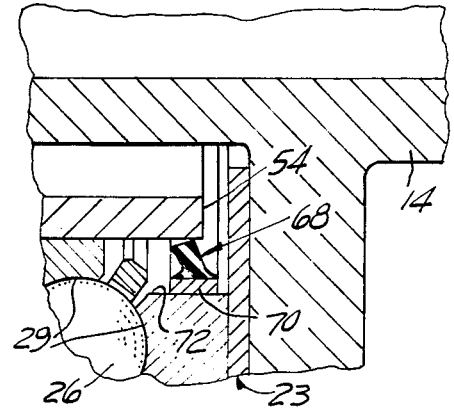

SELF-ALIGNING BEARING

CROSS-REFERENCE TO RELATED APPLICATION

The present application is a continuation-in-part of application Ser. No. 585,123, filed Mar. 1, 1984, now U.S. Pat. No. 4,742,902, and assigned to the same assignee as the present application. The present application is related to U.S. Pat. No. 4,566,578, and also assigned to the same assignee as the present application.

BACKGROUND OF THE INVENTION

The present invention relates to bearings in general, and more particularly to motor vehicle clutch release or throw-out bearings.

Mechanical disk clutches used in motor vehicles, for controllably coupling the motor vehicle engine flywheel to the gearbox input shaft, are normally biased to engagement by spring means, such as for example a diaphragm spring provided with release fingers engaged at their end with the revolving race of a release bearing, or throw-out bearing, the non-revolving race of the bearing being supported by a tubular sleeve or carrier. The sleeve or carrier is slidably mounted over a tubular member concentrically disposed around the driveshaft.

The revolving race of the release bearing, or throw-out bearing, is constantly engaged with the end of the clutch release fingers, even during clutch engagement. As long as the clutch is engaged, a relatively weak spring bias applied on the bearing carrier causes engagement of the throw-out bearing revolving race with the end of the clutch release fingers. The clutch is disengaged as a result of axial displacement of the throw-out bearing and bearing carrier assembly, which is effected by appropriate control means causing displacement of the bearing carrier and throw-out bearing in the direction that releases the clutch, with an accompanying considerable increase of the pressure exerted by the clutch release fingers upon the throw-out bearing revolving race. Controlled displacement of the bearing carrier and throw-out bearing assembly is effected by a mechanical clutch control fork lever, operated by the clutch pedal or a hydraulic actuator, or directly by a hydraulic actuator installed concentric to the driveshaft and operated from a master cylinder in turn operated by the clutch pedal.

Whether the throw-out bearing and bearing carrier assembly is mechanically actuated or hydraulically actuated, it is desirable that the throw-out bearing be supported by the bearing carrier in such manner as to be able to float, to a certain amount, radially for self-alignment of the axis of rotation of the bearing revolving race with the axis of rotation of the clutch. In view of the constant spring bias exerted upon the bearing after installation in a motor vehicle, the coupling between the bearing and the bearing carrier needs only hold the bearing onto the carrier, prior to and during assembly on a motor vehicle in such manner that the bearing does not become accidentally separated from the carrier.

SUMMARY OF THE INVENTION

The present invention has for principal object to provide a self-aligning ball bearing, having particular applications as a clutch release bearing, or throw-out bearing, providing a radially floating coupling between the bearing non-rotating race and the bearing housing, which is further provided with efficient sealing means preventing dirt from being introduced into the bearing and preventing the escape of lubricant from the interior of the bearing. A further object of the present invention is to provide a bearing of relatively small over-all dimensions, having considerable thrust force transmitting capability, which is of simple construction and lends itself to a single basic structure which, by means of a simple adapter, permits to operate a plurality of diverse motor vehicle clutch designs without requiring changes in design or dimension of the basic structure.

These and other objects of the present invention will become apparent to those skilled in the art when the following description of the best mode contemplated at the present for practicing the invention is read in conjunction with the accompanying drawing wherein like numerals refer to like or equivalent parts, and in which:

BRIEF DESCRIPTION OF THE DRAWING

FIG. 1 is a partial longitudinal sectional view of a clutch release or throw-out bearing and bearing carrier assembly illustrating an example of bearing according to the present invention;

FIG. 2 is a partial longitudinal sectional view thereof, but shown at an enlarged scale to illustrate details of structure;

FIG. 3 is an exploded view of the bearing forming part of the assembly of FIGS. 1 and 2;

FIG. 4 is a view of one of the components of the assembly of FIGS. 2 and 3, and showing a modification thereof;

FIGS. 5–8 are partial views similar to FIG. 2 but illustrating further modifications of the invention; and FIG. 9 is a view similar to FIG. 2, but showing a modification thereof.

DETAILED DESCRIPTION OF THE PREFERRED EMBODIMENTS

Referring to the drawing and more particularly to FIG. 1, a clutch release bearing 10 is illustrated mounted on the end of a bearing carrier 12, a portion only of which is shown. The bearing carrier 12 is in the form of a tubular or sleeve member 14 made of metal or plastic, having a central bore 16 which is disposed concentric to and slidable over a stationary tubular member, or quill 15, which is made integral or attached to, for example, the end plate of a motor vehicle gear box. The gear box input shaft 17 is disposed coaxial within the tubular member 15 and therefore within the central bore 16 of the bearing carrier 12. In some installations, the bearing carrier 12 is longitudinally displaceable by a control fork, not shown, as disclosed in application Ser. No. 585,123. The control fork is mechanically connected to a clutch pedal or, in the alternative, it may be actuated by the output member of a hydraulic slave cylinder. In other installations, the bearing carrier 12 is integral with, or attached to, the annular piston of an annular hydraulic slave cylinder mounted within clutch bell housing, not shown, or on the end plate of the gear box, not shown, concentric to the input shaft 17, as described in detail, for example, U.S. Pats. Nos. 4,585,106, 4,585,107, 4,585,108 and 4,585,109 all and assigned to the same assignee as the present application.

As best shown in FIG. 2, the carrier 12 supports on one end the clutch release or throw-out bearing 10 through the intermediary of a radially extending flange 18 formed integral with the sleeve member 14 of the carrier 12. The throw-out bearing 10, FIGS. 2 and 3, is a thrust ball bearing 19 comprising a non-revolving outer race 20 applied on the inside surface 21 of the rear end wall 22 of an annular housing 23. The housing 23 is substantially cup-shaped and comprises the rear end wall 22 formed as a radially extending annular flange and an integral peripheral wall 24 extending longitudinally in the form of a cylindrical rim. The ball bearing 19 has a second, or revolving, race 25, a plurality of steel balls 26 being held in an annular cage 28 disposed between the non-revolving race 20 and the revolving race 25 which are each provided with a raceway 29 that, in section, forms an arc of a circle accepting a portion of the peripheral surface of the rolling balls 26.

An annular adapter 30 has a cylindrical portion 31 press-fitted, or otherwise fastened, within the inner bearing race 25. The cylindrical portion 31 of the annular adapter 30 has, at an end, a radially and outwardly directed integral flange portion or spacer 32 provided, in the example of structure illustrated, with a rounded face 33 constantly engaged with the end of the clutch release spring fingers, two of which only are shown at 34. The frontal portion of the throw-out bearing 10 is closed by an annular cap 35 which has a cylindrical portion 36 which is press-fitted, or otherwise fastened, within the peripherical wall 24 of the bearing housing 23. The terminal edge 37 of the annular cap cylindrical portion 36 engages the peripheral edge of a dished spring washer 38, for example a Belleville-type spring washer, whose inner edge is engaged with an end face 39 of the non-revolving race 20, such as to compress the dished spring washer 38 and urge the face 40 of the non-revolving race 20 in engagement with the inner surface 21 of the end wall 22 of the annular housing 23. The annular end cap 35 has a radially extending flange portion 41 which projects between the annular adapter flange 32 and the frontal surface 42 of the bearing revolving race 25, an elastomeric seal 44 being installed at the edge of the closure cap flange 41 with its terminal lip 46 in engagement with the frontal surface 42 of the revolving race 25.

The biasing force, or pre-load force, exerted by the compressed dished spring 38 against the face 39 of the non-revolving bearing race 20 engages the rear face 40 of the non-revolving race 20 with the inner surface 21 of the rear end wall or flange portion 22 of the housing 23 with enough force to pre-load slightly the surfaces in engagement, while permitting radial displacement of the ball bearing non-revolving race 20 within the housing 23 such that the ball bearing 19 is self-aligning radially, even though the housing 23 may be held against the carrier flange 18 in a fixed axial position. For some application, it may be found desirable to hold the housing 23 of the throw-out bearing 10 against the carrier flange 18 in such manner, as disclosed in application Ser. No. 616,713 for example, that the housing 23 is also radially displaceable, with the result that an additional degree of freedom is provided for axial self-alignment of the throw-out bearing 10 relative to the clutch mechanism. In the structure of FIG. 2, the revolving race 25 of the ball bearing 19, which contains the annular adapter 30 fitted within the race 25, is urged, by construction, towards the non-revolving race 20 by the biasing action of the seal 44 and, once installed over the carrier 12 and in the clutch release system by a return spring, such as a coil spring 47 (FIG. 1) constantly urging the face 33 of the annular adapter 30 against the end of the clutch release fingers 34.

A particular aspect of the ball bearing 19 which is important to be noted is that the raceways 29 of the inner rotating race 25 and of the outer non-rotating race 20 surround the periphery of the balls 26 in such a way as to fully transmit from the revolving race 25 to the non-revolving race 20 the axially directed variable thrust loads during motion of the carrier 12 for releasing the clutch and the radially directed loads due to centrifugal force varying as a function of the velocity of revolution of the revolving race 25. Such an arrangement is graphically represented at FIG. 2 by an axial imaginary line 48 represneting the axis of application of the variable thrust force passing through the center 50 of the balls 26 and intersecting both raceways 29, and by a radial imaginary line 52 representing the axis of application of the variable centrifugal force, also passing through the center 50 of the balls 26 and intersecting the raceways 29, such that the bearing 10 is capable of transfering both longitudinal thrust loads and radial centrifugal loads under all conditions, without urging the balls 26 over the edge of the raceways 29.

The assembly consisting of the ball bearing 19, the annular housing 23 and the end cap 35, forms a basic standard assembly, designated at 53 at FIG. 3, for a throw-out bearing, useful in diverse clutch structures, which is very compact in construction and which, as previously mentioned, is axially self-aligning. For adapting the throw-out bearing 10 to a wide range of different clutch and clutch release finger designs all that is required is to press-fit, or otherwise attach into the ball bearing revolving race 25 an appropriate adapter 30 having a flange 32 of appropriate diameter and having a face 33 of an appropriate contour for engagement with the clutch release fingers 34, which may have ends of different shapes according to the clutch design, or of different lengths.

FIG. 4 illustrates a particular aspect of the invention resulting from the modular structure adopted for the clutch release or throw-out bearing 10 of the invention. A comparison of the structure illustrated at FIG. 2 in its assembled form and at FIG. 3 in an exploded form and of the structure of the modified adapter 30 of FIG. 4 reveals differences in design and dimensions between the adapter flanges. The adapter 30 of FIG. 4, however, is fully interchangeable with the adapter 30 of FIGS. 2-3 by being provided with a cylindrical body portion 31 of outer diameter allowing it to be fitted within the revolving race 25 of the ball bearing 19. However, the outwardly extending radial flange 32 of the adapter of FIG. 4 is shown, for illustrative purpose only, as extending outwardly further than the adapter flange 32 of the structure of FIGS. 2-3. Being of an over-all larger diameter, the flange 32 is therefore capable of engagement with spring diaphragm release fingers 34' shorter than the release finger 34 of FIG. 2. The fingers 34' have, also for illustrative purpose, a curved end 34a which, in the course of operation of the throw-out bearing for releasing the clutch, swings and rolls to the position shown in phantom line from the position shown in full line. The adapter flange 32, for the purpose of accommodating the arcuate end 34a of the fingers 34', is provided with a concave finger-engaging face 33'. Thus, the throw-out bearing 10 is capable of installation as part of a motor vehicle clutch release mechanism for a wide range of dimensions and designs by way of a fixed design and fixed dimension of the basic standard assembly 53 (FIG. 3) consisting of the ball bearing 19, the annular housing 23 and the end cap 35, provided with an appropriate adapter 30 having a flange 32 of appropriate dimension and shape, custom tailored, so to speak, for the particular size and design of the clutch mechanism to be operated. The basic standard assembly 53 is thus able to be manufactured at relatively low cost in tooling and materials, and a large inventory of diverse sizes of the basic standard assembly needs not be carried by the manufacturer, as an inventory of diverse adapters 30, each of particular dimension and shape of the flange 32, is all that is required to make the throwout bearing 10 capable of accommodating a variety of disc clutch designs and dimensions.

In the structure of FIG. 2, the bearing 10 is not completely hermetic as there is a gap between the end edge 54 of the annular adapter cylindrical portion 31 and the inner surface 21 of the end wall 22 of the housing 23. For some applications, it is preferable to provide a seal to close the gap, and this can be done simply, as shown at FIG. 5, by forming a groove 56 in the end edge 54 of the annular adapter cylindrical portion 31 in which is compressibly disposed the foot 58 of a seal 60 having a lip tip 62 in engagement with the housing end wall inner surface 21.

Alternatively, the annular seal 60 may be attached to the flange 64, FIG. 6, of a support annular member or ring 66 press-fitted, for example, in the interior of the tubular body portion 31 of the adapter 30, at the end thereof, which requires the seal 60 to be installed after the adapter 30 has been press-fitted, or otherwise installed, within the ball bearing revolving race 25, prior to installing the ball bearing 19 within the housing 23 and closing the bearing 10 by way of the end cap 35. Preferably, the seal 60, as shown at FIG. 7, is attached to a ring 66' which is press-fitted, or otherwise fastened, peripherally at the end of the adapter cylindrical portion 31, and thus forms part of the adapter 30 itself, which may thus be press-fitted within the ball bearing inner revolving race 25, without interference, after the bearing basic standard assembly is fully assembled.

As illustrated at FIG. 8, an annular seal 68 may be provided between the ball bearing non-rotating race 20 and the internal surface of the adapter cylindrical portion 31, the seal 68 being supported by a ring 70 press-fitted, or otherwise fastened, within the internal cylindrical surface 72 of the non-revolving ball bearing race 20. Such a seal structure does not protect the surface 21 of the end wall 22 of the housing 23 and, in structure where it is desired to protect such surface a V-shaped seal 74, FIG. 9, is provided, attached to the ring 70, having a lip tip 76 engaged with the peripheral surface of the adapter cylindrical portion 31 and a lip tip 78 engaged with the surface 21 of the end wall 22 of the housing 23. In the bearing structure of FIG. 9, a modification of the seal 44 mounted at the edge of the end cap 35 is ilustrated at 44', its lip tip 46' being engaged with the back surface of the adapter flange 32, rather than with the frontal surface 42 of the revolving race 25.

A further modification is also illustrated at FIG. 9, consisting in the cylindrical portion 24 of the housing 23 being provided internally with a shoulder abutment 80 limiting the depth at which the annular end cap 35 may be pressed into the inner wall of the cylindrical portion 24 of the housing 23 and such that the peripheral edge of the dished spring 38 is gripped between the annular end face 37 of the cylindrical portion 36 of the annular cap 35 and the abutment shoulder 80 of the inner wall of the cylindrical portion 24 of the housing 23. In this manner, the pre-load forces exerted by the dished spring 38 is precisely determined by design rather than being determined by linearly limiting the depth of introduction of the end cap cylindrical portion 36 within the annular housing 23.

Instead of press-fitting the adapter 30 within the ball bearing inner revolving race 25, and instead of press-fitting the annular end cap 35 within the cylindrical wall 24 of the housing 23, a quick-setting bonding compound may be used to attach the components together such as, for example, an anaerobic adhesive. Examples of such quick-setting bonding or adhesive compound are the compounds manufactured and marketed under the trademark "LOCTITE" by the Loctite Corporation, Newington, Conn. Such compounds are particularly useful in the bonding of cylindrical parts, having unusual high sheer strength exceeding that of conventional press-fitted parts by up to five times. They are fast curing and have excellent heat and solvent resistance characteristics, as well as providing a high sheer strength between adjoining interfaces. Curing of the adhesive is effected between 32° C. and 38° C. (90° and 100° F.), which are relatively low temperatures having no deleterious effect upon the elastomeric material of the seals.

It will be appreciated that the seals 44 or 44' and the seals 60, 68 and 74 provide effective sealing between the interior of the throw-out bearing 10 and the ambient for preventing introduction of dirt to the interior of the bearing and escape of lubricant from the interior of the bearing, the seal lip tips permitting both relative rotary motion of the surface in engagement with the seal lip and also lateral displacement of the ball bearing 19 permitting the bearing to align itself relative to the clutch mechanism. Preferably, the dished spring 38 is provided with apertures as shown at 82 at FIG. 9, allowing circulation of lubricant from one side of the dished spring 38 to the other. It will be appreciated that the dished spring 38 may be in the form of a zig-zag spring or in the form of a coil spring held in compression between the inner face of the annular end cap 35 and the face 39 of the non-revolving race 20.

It will be further appreciated that the basic standard assembly of the throw-out bearing 10, minus the adapter 30, may be made in over-all dimensions, more particularly its outer diameter, much smaller than would generally be the case with conventional thrust bearings, and that bearing basic standard assemblies of one or two sizes may accommodate a diversity of clutch mechanism designs and dimensions simply through the expedient of providing appropriate interchangeable annular adapters 30 having end flanges 32 of appropriate dimensions and shapes for engagement with the clutch release fingers 34

Having thus described the present invention by way of examples of structure well designed to accomplish the objects of the invention, modifications whereof will be apparent to those skilled in the art, what is claimed as new is as follows:

1. A clutch release assembly comprising an axially movable carrier, a radially extending annular surface on said carrier and a bearing supported on said annular surface, said bearing having a housing provided with an annular radially extending end wall engaged with said carrier annular surface, a non-revolving race having a surface in engagement with said housing and wall, a revolving race, and an annular adapter having an axially extending cylindrical portion attached to said revolving race and a radially outwardly extending flange portion in engagement with the actuating fingers of the clutch, said housing further including an axially extending cylindrical wall portion surrounding said bearing races and formed integral with said housing end wall and having an open end, said bearing further comprising an annular end cap fitted at the open end of said housing cylindrical wall portion, said annular end cap having a radially inwardly projecting flange extending between said revolving race and the flange portion of said adapter.

2. The clutch release assembly of claim 1 wherein said non-revolving race having a surface in engagement with said housing end wall is permitted limited radial movement relative to said housing end wall.

3. The clutch release assembly of claim 2 further comprising spring bias means in said housing urging said non-revolving race into engagement with said housing end wall.

4. The clutch release assembly of claim 2 wherein said bearing is a ball bearing and said races have each a raceway of a shape conforming to the peripheral shape of balls disposed between said raceways, and wherein a longitudinal imaginary line passing through the center of each of said balls intersects both said raceways.

5. The clutch release assembly of claim 1 wherein said annular end cap has an annular seal mounted at the edge of said end cap flange, said seal having a lip in engagement with the end face of said revolving race.

6. The clutch release assembly of claim 5 further comprising an annular seal mounted on an end of said adapter opposite to said adapter flange and having a lip in engagement with the surface of said housing end wall.

7. The clutch release assembly of claim 5 further comprising an annular seal mounted on said non-revolving race proximate the surface thereof in engagement with said housing end wall and having a lip in engagement with said adapter cylindrical portion.

8. The clutch release assembly of claim 5 further comprising an annular seal mounted on said non-revolving race proximate the surface thereof in engagement with said housing end wall and having a first lip in engagement with said adapter cylindrical portion and a second lip in engagement with said housing end wall.

9. The clutch release assembly of claim 5 wherein said bearing is a ball bearing and said races have each a raceway of a shape conforming to the peripheral shape of balls disposed between said raceways, and wherein a longitudinal imaginary line passing through the center of each of said balls intersects both said raceways.

10. The clutch release assembly of claim 5 further comprising spring bias means in said housing urging said non-revolving race into engagement with said housing end wall.

11. The clutch release assembly of claim 10 further comprising an annular seal mounted on an end of said adapter opposite to said adapter flange and having a lip in engagement with the surface of said housing end wall.

12. The clutch release assembly of claim 10 further comprising an annular seal mounted on said non-revolving race proximate the surface thereof in engagement with said housing end wall and having a lip in engagement with said adapter cylindrical portion.

13. The clutch release assembly of claim 10 further comprising an annular seal mounted on said non-revolving race proximate the surface thereof in engagement with said housing end wall and having a first lip in engagement with said cylindrical portion and a second lip in engagement with said housing end wall.

14. The clutch release assembly of claim 13 wherein said bearing is a ball bearing and said races have each a raceway of a shape conforming to the peripheral shape of balls disposed between said raceways, and wherein a longitudinal imaginary line passing through the center of each of said balls intersects both said raceways and a radially directed imaginary line passing through the center of each of said balls intersects both said raceways.

15. The clutch release assembly of claim 1 wherein said annular end cap has an annular seal mounted at the edge of said end cap flange, said seal having a lip in engagement with the back surface of said adapter flange.

16. The clutch release assembly of claim 15 wherein said bearing is a ball bearing and said races have each a raceway of a shape conforming to the peripheral shape of balls disposed between said raceways, and wherein a longitudinal imaginary line passing through the center of each of said balls intersects both said raceways.

17. The clutch release assembly of claim 15 further comprising spring bias means in said housing urging said non-revolving race into engagement with said housing end wall.

18. The clutch release assembly of claim 17 further comprising an annular seal mounted on an end of said adapter opposite to said adapter flange and having a lip in engagement with the surface of said housing end wall.

19. The clutch release assembly of claim 17 further comprising an annular seal mounted on said non-revolving race proximate the surface thereof in engagement with said housing end wall and having a lip in engagement with said adapter cylindrical portion.

20. The clutch release assembly of claim 17 further comprising an annular seal mounted on said non-revolving race proximate the surface thereof in engagement with said housing end wall and having a first lip in engagement with said cylindrical portion and a second lip in engagement with said housing end wall.

21. The clutch release assembly of claim 20 wherein said bearing is a ball bearing and said races have each a raceway of a shape conforming to the peripheral shape of balls disposed between said raceways, and wherein a longitudinal imaginary line passing through the center of each of said balls intersects both said raceways and a radially directed imaginary line passing through the center of each of said balls intersects both said raceways.

22. The clutch release assembly of claim 15 further comprising an annular seal mounted on an end of said adapter opposite to said adapter flange and having a lip in engagement with the surface of said housing end wall.

23. The clutch release assembly of claim 22 wherein said bearing is a ball bearing and said races have each a raceway of a shape conforming to the peripheral shape of balls disposed between said raceways, and wherein a longitudinal imaginary line passing through the center of each of said balls intersects both said raceways.

24. The clutch release assembly of claim 15 further comprising an annular seal mounted on said non-revolving race proximate the surface thereof in engagement with said housing end wall and having a lip in engagement with said adapter cylindrical portion.

25. The clutch release assembly of claim 24 wherein said bearing is a ball bearing and said races have each a raceway of a shape conforming to the peripheral shape of balls disposed between said raceways, and wherein a longitudinal imaginary line passing through the center of each of said balls intersects both said raceways.

26. The clutch release assembly of claim 15 further comprising an annular seal mounted on said non-revolving race proximate the surface thereof in engagement with said housing end wall and having a first lip in engagement with said cylindrical portion and a second lip in engagement with said housing end wall.

27. The clutch release assembly of claim 26 wherein said bearing is a ball bearing and said races have each a raceway of a shape conforming to the peripheral shape of balls disposed between said raceways, and wherein a longitudinal imaginary line passing through the center of each of said balls intersects both said raceways and a radially directed imaginary line passing through the center of each of said balls intersects both said raceways.

28. The clutch release assembly of claim 1 further comprising spring bias means in said housing urging said non-revolving race into engagement with said housing end wall.

29. The clutch release assembly of claim 28 wherein said bearing is a ball bearing and said races have each a raceway of a shape conforming to the peripheral shape of balls disposed between said raceways, and wherein a longitudinal imaginary line passing through the center of each of said balls intersects both said raceways.

30. The clutch release assembly of claim 1 wherein said bearing is a ball bearing and said races have each a raceway of a shape conforming to the peripheral shape of balls disposed between said raceways, and wherein a longitudinal imaginary line passing through the center of each of said balls intersects both said raceways.

* * * * *